United States Patent [19]

Iwaoka et al.

[11] 4,175,107

[45] Nov. 20, 1979

[54] CATALYTIC EXHAUST GAS PURIFYING DEVICE

[75] Inventors: Kazuo Iwaoka; Tagao Toh, both of Toyonaka; Minoru Fukada, Kadoma, all of Japan

[73] Assignee: Matsushita Electric Industrial Co., Ltd., Osaka, Japan

[21] Appl. No.: 794,115

[22] Filed: May 5, 1977

Related U.S. Application Data

[63] Continuation of Ser. No. 605,395, Aug. 18, 1975, abandoned.

[30] Foreign Application Priority Data

Sep. 3, 1974 [JP] Japan .............................. 49-101516
Sep. 3, 1974 [JP] Japan .......................... 49-106251[U]
Dec. 20, 1974 [JP] Japan .............................. 49-147448
Jun. 2, 1975 [JP] Japan ............................ 50-74986[U]

[51] Int. Cl.² .......................... B01J 8/02; B01J 35/04; F01N 3/15
[52] U.S. Cl. .................................... 422/114; 422/115; 422/171; 422/180; 422/181
[58] Field of Search ..... 23/288 FA, 288 FB, 288 FC; 60/299, 288, 301; 423/212, 213.7; 252/477 R; 422/114, 115, 171, 177, 180, 181

[56] References Cited

U.S. PATENT DOCUMENTS

| 2,956,865 | 10/1960 | Williams, Sr. | 23/288 FC |
| 3,050,935 | 8/1962 | Eastwood | 23/288 FA |
| 3,086,839 | 4/1963 | Bloch | 23/288 FA |
| 3,110,300 | 11/1963 | Brown et al. | 23/288 FA |
| 3,166,895 | 1/1965 | Slayter et al. | 23/288 FC |
| 3,180,712 | 4/1965 | Hamblin | 23/288 FB |
| 3,297,400 | 1/1967 | Eastwood | 23/288 FA |
| 3,362,783 | 1/1968 | Leak | 23/288 FC |
| 3,712,030 | 1/1973 | Priest | 60/288 |
| 3,755,534 | 8/1973 | Graham | 23/288 FC |
| 3,791,143 | 2/1974 | Keith et al. | 23/288 FA |
| 3,811,845 | 5/1974 | Nakamura | 23/288 FC |
| 3,879,944 | 4/1975 | Bertsch | 60/299 |

Primary Examiner—Michael S. Marcus
Attorney, Agent, or Firm—Burgess, Ryan and Wayne

[57] ABSTRACT

A catalytic converter for purifying the exhaust gases from an internal combustion engine, wherein a plurality of catalytic layers are arrayed in series and spaced apart by a predetermined distance from each other, and bypass paths are provided in such a way that except for the last catalytic layer, a part of the exhaust gases may bypass each catalytic layer without making contact therewith and may directly flow into the next catalytic layer.

7 Claims, 19 Drawing Figures (a)

(b)

(a)

(b)

(a)

(b)

CATALYTIC EXHAUST GAS PURIFYING DEVICE

This is a continuation, of application Ser. No. 605,395, filed Aug. 18, 1975.

BACKGROUND OF THE INVENTION

The present invention relates to a device for purifying exhaust gases of the type utilizing catalysts for converting the toxic components thereof such as carbon monoxide (CO) and hydrocarbons (HC) into nontoxic or harmless gases in a very efficient manner.

The exhaust gases emitted from internal combustion engines contain toxic gases or pollutants such as carbon monoxide (CO), hydrocarbons (HC) an nitrogen oxides (NOx), and in order to remove such pollutants various devices have been devised and demonstrated. Among them, the devices utilizing catalysts (to be referred to as the catalytic converters in this specification) are most advantageous because they are simple in construction and may be incorporated in the exhaust systems of internal combustion engines without requiring modifications of the engines and may not adversely affect the performance of the engines.

The conventional catalytic converters use various types of catalysts such as pellet or bead type, honeycomb type and so on. The bead or pellet type catalyst has greater attrition loss so that if the beads or pellets should be discharged into the atmosphere, they will cause a secondary air pollution problem. When the temperature of a honeycomb type catalyst rises excessively the catalyst will be melted away. Furthermore the honeycomb type catalyst has a defect that it is easily susceptible to damage due to vibrations or shocks.

The catalytic oxidation of carbon monoxide and hydrocarbons for converting them into water and carbon dioxide is an exothermic reaction. When a catalytic converter is used in conjunction with an internal combustion engine with a total stroke volume from 1,000 to 2,000 cc, the temperature of the catalytic layer reaches as high as 500° to 600° C. In case of automotive engines, a relatively large quantity of carbon monoxide and hydrocarbons is discharged when the engine is running under a greater load, when the engine braking is applied or when misfiring occurs. In case of two cycle engines, a large quantity of unburned hydrocarbons is discharged because of the operating principles of, and fuel used in such engines, so that the temperature of the catalyst rises as high as 1,000° C. As a result, the performance of the catalyst is adversely affected.

SUMMARY OF THE INVENTION

One of the objects of the present invention is therefore to provide an improved catalytic converter for removing the pollutants contained in the exhaust gases discharged from an internal combustion engine.

Another object of the present invention is to provide a catalytic converter of the type described above wherein the catalyst or catalytic layers may be maintained at relatively low temperatures and which may purify the pollutants in the exhaust gases at a high purification ratio.

A further object of the present invention is to provide an improved catalytic converter of the type described wherein the excessive temperature rise of the catalyst or catalytic layers which causes the deterioration on poisoning of the catalyst may be prevented.

A further object of the present invention is to provide an improved catalytic converter which may be used not only in the exhaust system of a four- or two cycle internal combustion engine for an automotive vehicle, motor cycle, snow vehicle, motor-boat, light plane or a generator installed on the ground for removing the pollutants contained in the exhaust gases but also in the gas purification system or the like in a chemical plant using a large quantity of organic solvents.

To the above and other objects, the present invention provides a catalytic converter wherein a plurality of catalytic layers are arrayed in series and spaced apart from each other by a suitable distance, and bypass means is provided in such a way that except for the last catalytic layer a part of the exhaust gases may bypass each catalytic layer without making contact therewith and may directly flow into the next catalytic layer.

The above and other objects, features and advantages of the present invention will become more apparent from the following description of preferred embodiments thereof taken in conjunction with the accompanying drawing.

DESCRIPTION OF THE PREFERRED EMBODIMENTS

Figure 1:
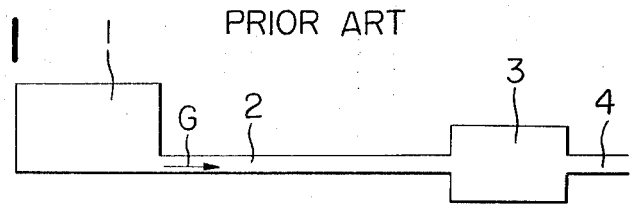
FIG. 1 is a schematic diagram of the exhaust system of an internal combustion engine.
Figure 2:
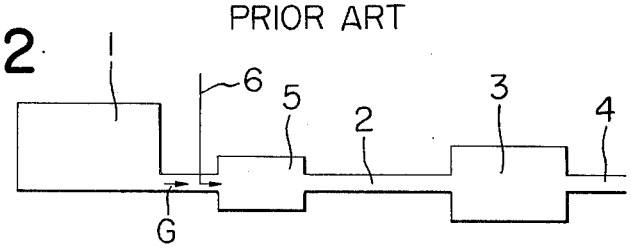
FIG. 2 is a schematic view similar to FIG. 1 illustrating a catalytic converter incorporated therein.

As shown in FIG. 1, the exhaust gases G from an internal combustion engine 1 are discharged into the surrounding atmosphere through an exhaust pipe 2, a muffler 3 and a tail pipe 4. In case of an exhaust system equipped with a catalytic converter, the exhaust gases from the engine 1 flows into a catalytic converter 5 where oxygen contained in the air charged therein as indicated by the arrow 6 reacts with carbon monoxide and unburned hydrocarbons in the exhaust gases to convert them into carbon dioxide ($CO_2$) and water ($H_2O$), and then the purified exhaust gases are discharged into the surrounding atmosphere through the exhaust pipe 2, the muffler 3 and the tail pipe 4. The preferred embodiments of the present invention will be described as being applied to the exahust systems for two-cycle engines for motorcycles which discharge, in general, the exhaust gases with a high content of unburned hydrocarbons.

Figure 3:
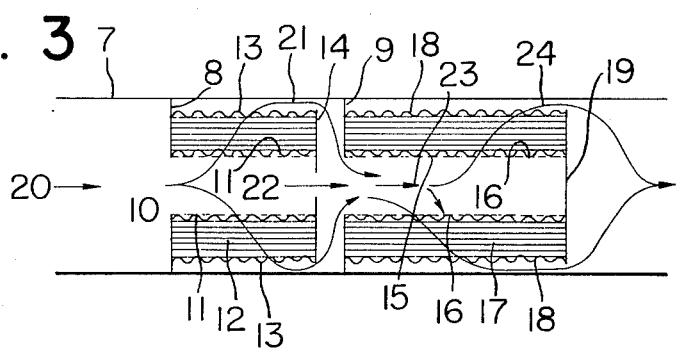
FIG. 3 is a schematic sectional view of a first embodiment of a catalytic converter in accordance with the present invention.

First Embodiment, FIG. 3

In the first embodiment shown in FIG. 3, in order to form a catalytic layer to be described hereinafter a catalyst element is used which is prepared by impregnating a sheet of silica cloth into the colloidal solution of alumina and silica, thereafter drying the silica cloth at about 100° C., sintering it at about 550° C. for adhering about 15-17% by weight alumina-silica structure upon the silica cloth, and then depositing 0.4% by weight of platinum upon the sintered silica cloth or catalyst carrier.

Within a catalytic converter casing 7 are disposed two catalytic layers or catalytic layer assemblies; that is, a first catalytic layer 12 with a length of 100 mm and a second catalytic layer 17 with a length of 150 mm and spaced apart from the first catalytic layer 12 by 20 mm in the downstream direction. The first catalytic layer 12 comprises a catalytic layer casing comprising an inner tube 10 of an outer diameter of 40 mm and a length of 100 mm, an end plate or disk 8 which is attached to the upstream or front end of the inner tube 10 and the inner wall of the converter casing 7 of an inner diameter of 90 mm in coaxial relation therewith and which has an internal diameter equal to the inner tube 10, and a shielding disk 14 of an outer diameter of 73 mm which is attached to the downstream or rear end of the inner tube 10 in coaxial relation therewith and has an opening the area of which is about 40% of the cross sectional area of the inner tube 10, the outer periphery of the shielding disk 14 and the inner wall of the converter casing 7 defining an exhaust gas passage; an inner stainless steel wire cloth or screen of 8 mesh and woven from heat-resisting stainless steel wire of a diameter of 0.5 mm and wrapped in one layer around the outer side wall of the inner tube 10, the catalytic element of the type described above and wrapped in 15 layers around the inner stainless wire screen 11, and an outer stainless steel wire screen 13 similar to the inner screen 11 and wrapped in one layer around the catalytic element.

The second catalytic layer 17 spaced apart from the first catalytic layer 12 by 20 mm in the downstream direction is substantially similar in construction with the first catalytic layer assembly 12. That is, it comprises a catalytic layer casing comprising an inner tube 15 of an outer diameter of 40 mm and a length of 150 mm, an end or guide plate 9 attached to the upstream end of the inner tube 15 and the inner wall of the casing 7, and a shielding disk 19 of an outer diameter of 73 mm attached to the downstream or rear end of the inner tube 15; an inner stainless screen 16 wrapped around the outer side wall of the inner tube 15, the catalytic element wrapped 15 times or layers around the inner screen 16, and an outer stainless steel screen 18 wrapped around the catalytic element.

The side walls of both the inner tubes 10 and 15 are perforated, and a steel tube with the perforated side wall will be described as a "perforated steel tube" for brevity in this specification. The flow 20 of the exhaust gases from the engine is divided into two main flows; that is, the first main flow 21 flowing through the first catalytic layer 12 so that carbon monoxide and hydrocarbons are oxidized and the second main flow 22 bypassing the first catalytic layer 12 and directly flowing into the second catalytic layer 17 through the bypass opening of the shielding disk 14 of the first catalytic layer assembly. The exhaust gases flowing out of the first catalytic layer 12 flows through the passage between the casing 7 and the shielding disk 14 into the inner tube 15, and joins with the exhaust gases directly flowing therein through the inner tube 10. Thereafter all of the exhaust gases pass through the second catalytic layer 17 so that the remaining carbon monoxide and hydrocarbons are oxidized. Since only a part of the exhaust gases discharged from the engine flows through the first catalytic layer 12, the temperature rise thereof due to the heat of reaction may be limited. Furthermore the heat of the exhaust gases passing through the first catalytic layer 12 may be dissipated through the converter casing 7 before the exhaust gases flow into the inner tube 15 of the second catalytic layer assembly. Since the carbon monoxide and hydrocarbons contained in the exhaust gases which have flowed through the first catalytic layer 12 have been already oxidized or purified, the content of carbon monoxide and hydrocarbons contained in the exhaust gases in the inner tube 15 of the second caytalytic layer assembly is considerably lower than that of the exhaust gases 20 directly discharged out of the engine. As a result, the temperature rise of the second catalytic layer 17 due to the catalytic reaction may be considerably limited.

Figure 4:
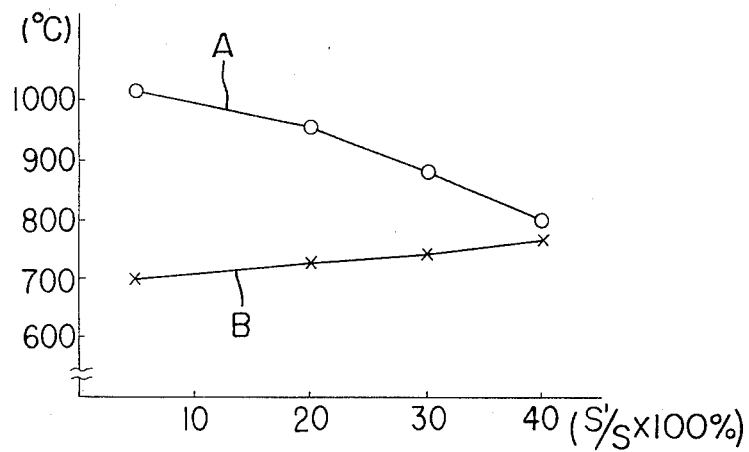
FIG. 4 is a graph used for the explanation of the performance thereof.

The inventors conducted the CVC measurements in LA-4 mode by using a two-cycle two-cylinder engine of 350 cc with the catalytic converter of the first embodiment incorporated in the exhaust system thereof. The maximum temperatures of the first and second catalytic layers 12 and 17 are indicated by the curves A and B in FIG. 4, wherein S=cross sectional area of inner tube and S'=opening area of shielding plate 14. When the catalytic converter of the first embodiment was not incorporated in the exhaust system which included a conventional muffler, the CO emission was 9.66 gr/km and the hydrocarbon emission was 8.93 gr/km, but when the catalytic converter of the first embodiment was attached, the CO emission was reduced to 4.21 gr/ku and the hydrocarbon emission, to 1.52 gr/km, the maximum temperature of the catalytic converter being about 810° C.

In addition to the catalyst carrier made of the silica cloth, cloth of highly purified alumina fibers, quartz fibers, silicon carbide fibers or the like which may be coated with alumina, silica, magnesia, zirconia, titania or the like may be used. As a catalyst, platinum, palladium, rhodium, ruthernium, iridium, rhenium, osmium, neodium, bismuth, copper, cobalt, iron, nickel, manganese, chromium, vanadium and the like or the oxides thereof may be used.

In the first embodiment, the first and second catalytic layer assemblies have been described as being spaced apart from each other by 20 mm, but it will be understood that the present invention is not limited to this distance.

Figure 5:
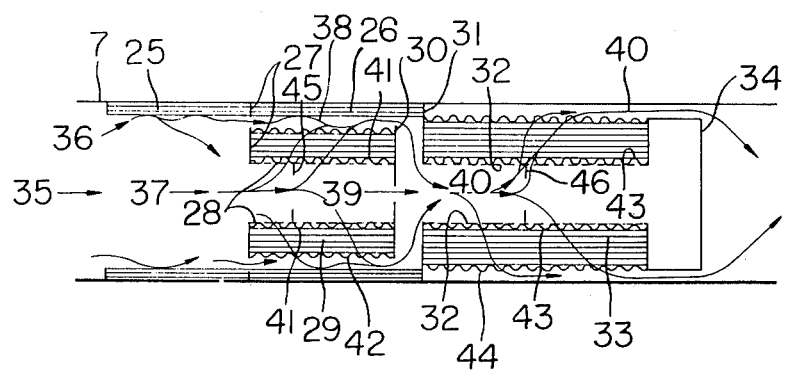
FIG. 5 is a schematic sectional view of a second embodiment of the present invention.

Second Embodiment, FIG. 5

The second embodiment shown in FIG. 5 is substantially similar in construction to the first embodiment except that a first auxiliary catalytic layer 25 of a length of 100 mm is mounted on the inner wall of the converter casing 7 immediately before the upstream end of the first catalytic layer assembly, a second auxiliary catalytic layer 26 is attached to the inner wall of the converter casing 7 within the first catalytic layer assembly, and the second catalytic layer assembly is provided with a surging tank or chamber 34.

The first auxiliary catalytic layer 25 comprises an inner stainless screen of the type described in the first embodiment and attached to the inner side wall of the converter casing 7 of an inner diameter of 90 mm, the catalytic element of the type described in the first embodiment and wrapped in three layers around the inner screen, and an outer screen wrapped around the catalytic element. The second auxiliary catalytic layer 26 is substantially similar in construction except that it has a length of 120 mm.

The first catalytic layer assembly is substantially similar in construction to that of the first embodiment. An inner perforated steel tube 28 has an inner diameter of 40 mm and a length of 100 mm, and an end disk 27 attached to the upstream end of the first catalytic layer assembly has, in addition to its center opening, 24 small holes of a diameter of 5 mm formed through the ring shaped portion and angularly spaced apart from each other 15° (=350°/24). A shielding disk 30 attached to the downstream or rear end of the inner tube 28 has an outer diameter of 66 mm and a bypass opening of a diameter of 10 mm. After an inner screen 41 having been wrapped around the inner tube 28, the catalytic element is wrapped in 10 layers around the inner screen 41, and then an outer screen 42 is wrapped in one layer around the first catalytic element or layer 29.

The upstream of front end of the second catalytic layer assembly is spaced apart from the rear end of the first catalytic layer assembly by 20 mm, and is substantially similar in construction to that of the first embodiment shown in FIG. 3. That is, an inner perforated steel tube 32 has an outer diameter 40 mm and a length of 150 mm, and has an end plate or disk 31 attached to the front end thereof. The surge tank or chamber 34 attached to the rear end of the inner tube 32 has a length of 40 mm and an outer diameter of 73 mm. An inner stainless wire screen 43 is wrapped around the inner tube 32, and the catalytic element is wrapped in 15 layers around the inner screen 43 and an outer stainless steel wire screen 44 is wrapped in one layer around the second catalytic element or layer 33.

A first deflection disk or plate 46 is disposed within the inner tube 28 and spaced apart from the front end thereof by 30 mm and has a center opening of a diameter of 26 mm. In like manner, a second deflection dish or plate 46 is disposed within the inner tube 32 and spaced apart from the front end thereof by 75 mm and has a center opening of a diameter of 24 mm. These deflection disks 41 and 46 have the function of uniformly distributing the exhaust gases and flowing them through the first and second catalytic layers 29 and 43, and cooperate with the surging tank or chamber 34 so as to absorb the pulsations of the exhaust gases.

At the entrance of the catalytic converter a first portion 36 of the flow 35 of exhaust gases discharged from the engine flows through and is in contact with the first auxiliary catalytic layer 25; a second portion 38 of the main flow passes through the 24 bypass openings of the end plate 27; a third portion 37 of the main flow passes through the first catalytic layer 29; and a fourth portion 39 of the main flow passes through the inner tube 28 and the bypass opening of the shielding plate 30 directly into the second catalytic layer assembly. The exhaust gases which have flowed through the first catalytic layer 29 and in contact with the second auxiliary catalytic layer 26 flow into the second catalytic layer assembly and are mixed with the exhaust gases directly flowed therein. In the second catalytic layer assembly, all exhaust gases flow through the second catalytic layer 33 whereby carbon monoxide and hydrocarbons are oxidized.

Figure 6:
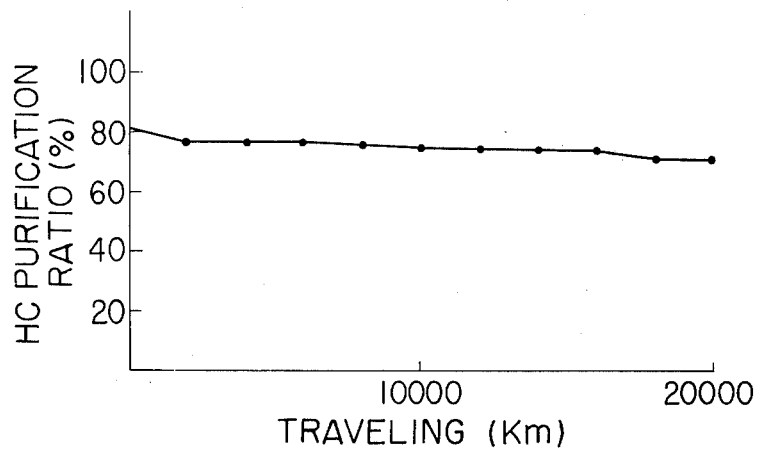
FIG. 6 is a graph used for the explanation of the performance thereof; that is, the relationship between the travel milage and hydrocarbon purification or removal ratio.

The inventors conducted the CVS measurements in LA-4 mode with a two-cycle two-cylinder engine of 350 cc incorporating the catalytic converter of the second embodiment. The maximum temperature was 750° C., and the CO emission was 3.84 gr/km while the hydrocarbon (HC) emission was 1.58 gr/km. When the catalytic converter was not incorporated in the exhaust system which included a conventional muffler, the CO emission was 10.06 gr/km while the hydrocarbon (HC) emission was as high as 8.35 gr/km. FIG. 6 shows the results of the endurance tests of the catalytic converter of the second embodiment, that is, the relationship between the traveling milage and the ratio of hydrocarbons purified. When the different catalyst carrier was used and the tests were conducted under the same conditions, the hydrocarbon (HC) emission was reduced as low as 1.179 gr/km.

Figure 7:
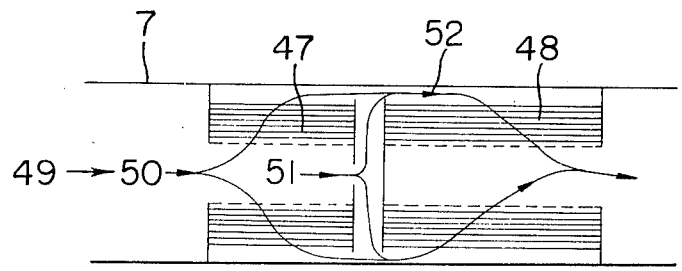
FIGS. 7 through 15 are schematic views of from III-th to XII-th embodiments of the present invention.

Third Embodiment, FIG. 7

The third embodiment shown in FIG. 7 is substantially similar in construction to the first embodiment shown in FIG. 3 except that the second catalytic layer assembly 48 is reversed in direction by 180°. That is, the end plate is attached to the rear end while the shielding plate is attached to the front end. The flow 49 of the exhaust gases from the engine is divided into a first main flow flowing through the first catalytic layer 47 and a second main flow flowing through the inner tube of the first catalytic layer assembly and flowing directly into the second catalytic layer assembly where it is mixed as indicated by 52 with the exhaust gases which have passed through the first catalytic layer 47 and have been purified. All the exhaust gases thus mixed flow through the second catalytic layer 48.

Figure 8:
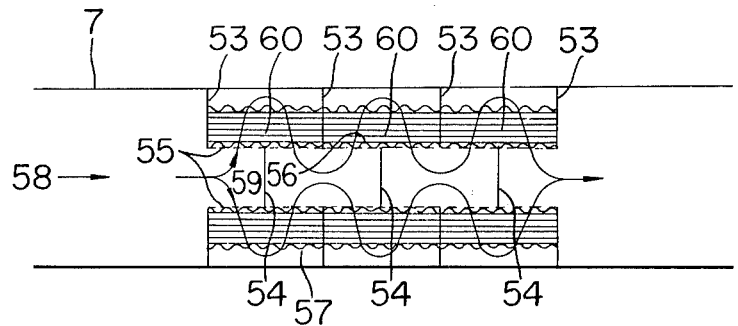

Fourth Embodiment, FIG. 8

The fourth embodiment shown in FIG. 8 has an inner perforated steel tube 55 of a length of 800 mm and an outer diameter of 40 mm. Four outer ring-shaped shielding disks 53 fitted over the inner tube 55 between the tube 55 and the inner side wall of the converter casing 7 are spaced apart from each other by 100 mm, and three inner shielding disks 54 with the outer diameter equal to the inner diameter of the inner tube 55 are disposed within the inner tube 55 at the midpoints between the adjacent outer shielding disks 53 and spaced apart from each other by 100 mm. That is, the first, second and third inner shielding disks 54 are spaced apart from the front end of the inner tube 55 by 50 mm, 150 mm and 250 mm, respectively. Around the inner tube 55 and between the adjacent outer shielding disks 53 is wrapped the stainless steel wire screen in one layer, and the catalytic element similar to that described in the first embodiment is wrapped in ten layers around the inner screen. Thereafter, the outer stainless steel wire screen is wrapped around the catalytic element in one layer. Thus, three catalytic layers 60 are formed.

The exhaust gases 58 from the engine first flow into the inner tube 55 and are deflected by the first inner shielding disk 54 in the direction indicated by the arrow 59 to flow through the catalytic layer 60. The exhaust gases flowing out of the catalytic layer 60 are further deflected by the outer shielding disk 53 to flow through the catalytic layer 60 again into the inner tube 56. In like manner, the exhaust gases flow through the catalytic layers 60 in the zig-zag courses as indicated by the arrow and then discharged out of the converter.

The fourth embodiment has a distinct feature that the overall temperature of the catalytic layers 60 may be maintained at a relatively low temperature because the reaction heat may be carried by the exhaust gas flows and dissipated through the casing 7 into the surrounding atmosphere. The fourth embodiment has a further remarkable feature that the oxidation of carbon monoxide and hydrocarbons may be much facilitated because the exhaust gases flow through three catalytic layers. Therefore the catalytic converter of the fourth embodiment is best adapted for use with an engine which discharges the exhaust gases with the higher content of carbon monoxide and hydrocarbons.

Figure 9:
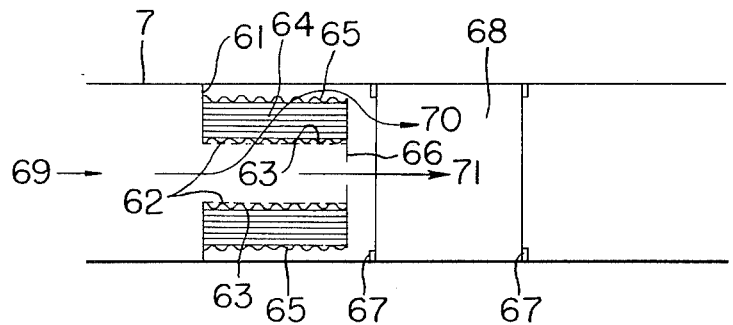

Fifth Embodiment, FIG. 9

The fifth embodiment shown in FIG. 9 comprises a first catalytic layer assembly 64 which is substantially similar in construction to the first catalytic layer assembly 12 of the first embodiment shown in FIG. 3, and a second catalytic layer 68 which is of the honeycomb type. That is, the first catalytic layer assembly has an inner perforated steel tube 62 of an outer diameter 40 mm and a length of 100 mm, an end plate 61 attached to the front end of the inner tube 52 and to the inner wall of the converter casing 7 of an inner diameter of 90 mm, and a shielding disk 66 of an outer diameter 73 mm having a center bypass opening the area of which is about 40% of the cross sectional area of the inner tube 62. Around the inner tube 62 is wrapped in one layer an inner stainless wire screen, and the catalytic element similar to that described in the first embodiment is wrapped in 15 layers around the inner screen. An outer stainless wire screen 65 is wrapped in one layer around the catalytic element. The honeycomb type second catalytic layer 68 is spaced apart from the first catalytic layer 64 by 20 mm, and is interposed between the front and end disks 67 of an outer diameter of 90 mm and an inner diameter of 80 mm. The second catalytic layer assembly 68 has a length of 100 mm and an outer diameter of 90 mm, and carries 0.2% by weight platinum.

The flow 69 of exhaust gases from the engine is divided into a first main flow 70 which passes through the first catalytic layer 64 and then flows through the second catalytic layer 68, and a second main flow 71 which flows through the inner tube 62 of the first catalytic layer assembly and the bypass opening of the shielding plate 66 thereof into the second catalytic layer 68.

Figure 10:
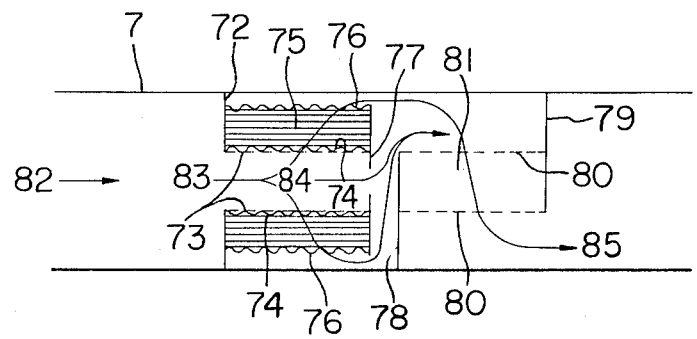

Sixth Embodiment, FIG. 10

The sixth embodiment shown in FIG. 10 is substantially similar in construction to the fifth embodiment shown in FIG. 9 except a second catalytic layer assembly 81. That is, the second catalytic layer assembly 81, which is spaced apart from a first catalytic layer assembly 75 (which is substantially similar in construction to the first catalytic layer assembly 64 of the fifth embodiment) by 20 mm, comprises front and rear circular-segment-shaped supporting members attached to the inner wall of the converter casing of a diameter of 90 mm and extended at right angles to the axis of the converter casing 7 in the opposite directions in such a way that their chords or straight sides are extended in the same direction. The second catalytic layer assembly 81 further comprises upper and lower perforated end plates 80 each of which is attached to the straight side of the supporting member 78 or 79, the inner wall of the casing 7, and the inner or outer side wall of the supporting member 79 or 78, and which are spaced apart vertically from each other by 40 mm. Within the space defined by the front and rear supporting members 78 and 79 and the upper and lower end plates 80 are filled compactly catalyst-carrier beads or the like of a diameter 5 mm made of alumina and deposited with 0.2% by weight platinum.

As with the fifth embodiment, the flow of exhaust gases 82 from he engine is divided into a first main flow 83 flowing through the first catalytic layer 75 and a second main flow 84 flowing through the inner tube of the first catalytic layer assembly directly into the second catalytic layer 81. The exhaust gases which have passed through the first catalytic layer 75 also flow down through the second catalytic layer 81.

So far the use of the pellet, bead and honeycomb type catalyst carriers have been described only in conjunction with the second catalytic layers of the fifth and sixth embodiments, but it is to be understood that they may be used instead of the catalytic layers of the type described in conjunction with the first to fourth embodiments and with the first catalytic layer assemblies of the fifth and sixth embodiments. However, the auxiliary catalytic layers directly attached to the inner walls of the converter casing 7 are preferably of the type described in conjunction with the second embodiment; that is, of the fiber or wire cloth or screen type.

Seventh Embodiment (Modification of First Embodiment)

In the seventh embodiment (modification of the first embodiment), instead of the inner stainless wire screens 11 and 16, may be used a silica cloth protective screen upon the surface of which is deposited or attached 12% by weight (based upon the weight of the silica cloth screen) of an inorganic compound consisting of silica, alumina, magnesia, and zirconia. The silicon cloth protective screen is wrapped in five layers around the inner tube and serves to protect the catalyst in case of the misfiring.

Eighth Embodiment (Second Modification of First Embodiment)

In the eighth embodiment, an additional catalytic layer assembly substantially similar to construction to that of the seventh embodiment (first modification) is disposed immediately before the first catalytic layer assembly 12 so that three catalytic layer assemblies are arranged in series in the converter.

Ninth Embodiment (Third Modification of First Embodiment)

In the ninth embodiment (third modification), a tank of a volume of 60 cc is disposed on the downstream side of the inner tube 15 of the second catalytic layer assembly and is hydraulically communicated only with the rear end of the inner tube 15.

This arrangement not only prevents the decrease in engine output but also serves to distribute uniformly the exhaust gases to flow through the catalytic layers.

It should be understood that the above VII, VIII and IX embodiments are also applied to the other embodiments of the present invention.

Figure 11:
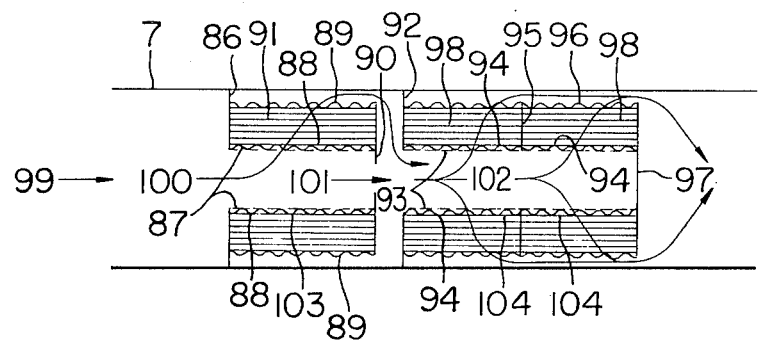

X-th Embodiment, FIG. 11

The first catalytic layer assembly 91 of the tenth embodiment shown in FIG. 11 is substantially similar in construction to that of the first embodiment shown in FIG. 3 except the construction of the catalytic layer.

That is, the inner tube 87, the end plate 86 and the shielding disk 90 have the same dimensions with those of the first embodiment. The catalytic layer is assembled by first wrapping in one layer an inner stainless wire screen 88 similar to that of the first embodiment, thereafter wrapping in five layers a protective cloth or screen 103 of the type described in the VII-th embodiment, next wrapping the catalyst element similar to that described in conjunction with the first embodiment in 15 layers, and then an outer stainless wire screen 89 in one layer over the catalyst element.

A second catalytic layer assembly 98 is spaced apart from the first catalytic layer assembly 91 by 20 mm as with the first embodiment, and has a perforated inner steel tube 93 of a length of 160 mm and an outer diameter of 40 mm. An end plate is attached to the front end of the inner tube 93 and to the inner side wall of the converter casing 7 of 90 mm in diameter, and an intermediate shielding disk 95 of an outer diameter of 73 mm and an inner diameter equal to the outer diameter of the inner tube 93 is fitted over the inner tube 93 and is spaced apart from the front end thereof by 80 mm. A rear shielding disk of an outer diameter of 73 mm is attached to the rear end of the inner tube 97. The second layers 98 mounted around the inner tube 93 between the end plate 92 and the intermediate shielding disk 95 and between the disk 95 and the rear shielding disk 97 are substantially similar in construction to the first catalytic layer 91. That is, each of the second catalytic layers 98 consists of an inner screen 94, a protective layer 104, the catalyst, and an outer screen.

The flow 99 of exhaust gases from the engine is divided into a first main flow 100 flowing through the first catalytic layer and a second main flow 101 passing through the inner tube of the first catalytic layer assembly and directly flowing into the inner tube 93 of the second catalytic layer assembly. The exhaust gases which have passed through the first catalytic layer 91 joins in the inner tube 93 with the exhaust gases bypassing the first catalytic layer 91 and then flows through the second catalytic layers 98.

Figure 12:
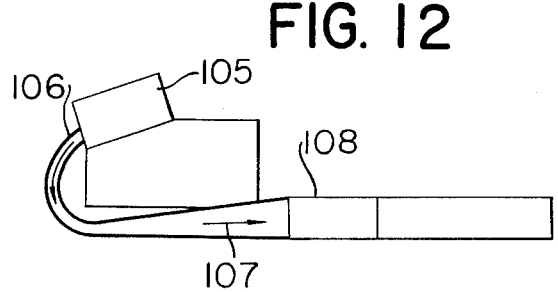
Figure 13:
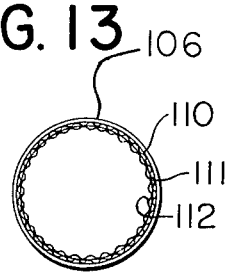

XI-th Embodiment, FIGS. 12 and 13

In the XI-th embodiment shown in FIGS. 12 and 13, the inner wall of an exhaust pipe 106 connecting an engine 105 with a catalytic converter 108, which may be of any type selected from the above described first to tenth embodiments, is lined with a catalytic layer consisting of an inner stainless wire screen 110 of 20 mesh lined in one layer over the inner wall of the exhaust pipe 106, the catalyst element 111 similar to that described in conjunction with the first embodiment lined in two layers over the inner screen 110, and an outer stainless wire screen 112 lined in one layer over the catalyst element 111.

The exhaust gases discharged from the engine 105 flows through the exhaust pipe 106 as indicated by the arrow 107 in contact with the catalytic layer; that is, the catalytic element 111 so that some of carbon monoxide and hydrocarbons contained in the exhaust gases may be purified or oxidized before the exhaust gases flow into the catalytic converter 108. This arrangement has advantages in that in case of starting the engine, the exhaust gas purification ratio may be much improved and in that the undesirable temperature rise of the catalytic converter may be prevented.

XII-th Embodiment

So far the bypass opening has been described as having a predetermined area, but in the XII-th embodiment the area of the bypass opening may be varied depending upon the operating conditions of the engine and the conditions of the catalyst or catalytic layers so that the catalytic reaction may be facilitated when the engine is started and during the warm-up period and that the exhaust gases may flow uniformly through the catalytic layers.

Figure 14:
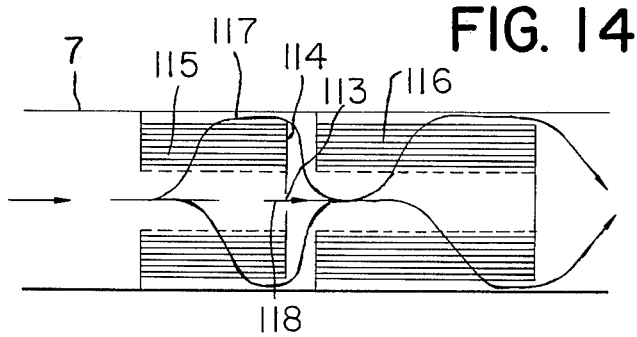
Figure 15:
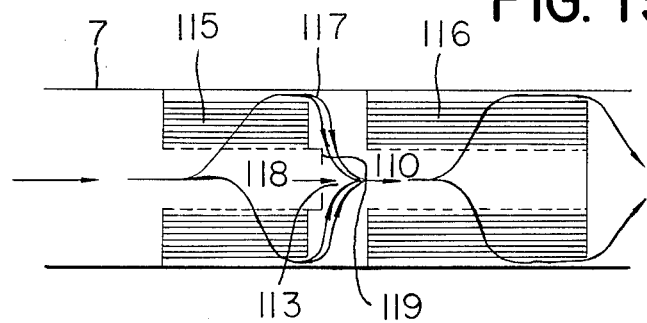

The XII-th embodiment shown in FIG. 14 is substantially similar to the first embodiment shown in FIG. 3 except the area of the bypass opening 113 of the shielding plate 114 is variable as will be described in detail hereinafter. That is, the catalytic converter shown in FIG. 14 has a first catalytic layer assembly 115 and a second catalytic layer assembly 116, and, as with the first embodiment, the exhaust gases from the engine are divided into the exhaust gas flow 117 flowing through the first catalytic layer 115 and the exhaust gas flow 118 flowing through the bypass opening 113 directly into the second catalytic layer assembly 116. When the engine is started, the area of the bypass opening 113 is reduced to, for instance, 10% (0% if required) of the cross sectional area of the inner tube of the first catalytic layer assembly 115 so that the first catalytic layer 115 may be raised to a catalytic reaction temperature as soon as possible. After the first catalytic layer 115 has been heated by the exhaust gases to a temperature between 300° and 500° C., the bypass opening 113 is opened to about 40% of the cross sectional area of the inner tube. In the catalytic converter shown in FIG. 15, arrangement is made for ensuring the more efficient contact with catalytic layer of the exhaust gases which have passed through the bypass opening 118 and joined with the exhaust gases which have bypassed the first catalytic layer 115.

Figure 16:
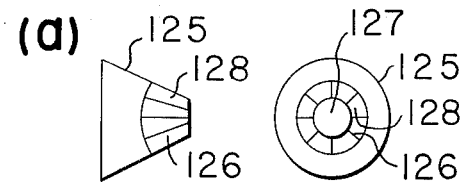
FIGS. 16 through 19 are schematic views of bypass opening area control means used in conjunction with the XII-th embodiment shown in FIGS. 14 and 15.
Figure 16:
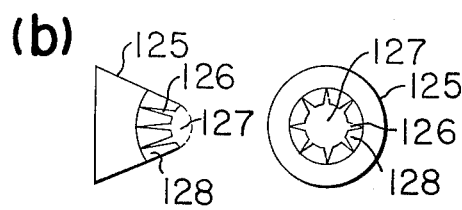

In order to vary the area of the bypass opening 113, means for controlling the bypass opening area of the types shown in FIGS. 16-19 are used. The bypass opening area control means shown in FIG. 16 is made of a lamination of two different metals and shaped in the form of a truncated cone 125. The side surface close to the top is provided with a plurality of slits 126 to form bimetallic strips 128 so that the bimetallic strips may bend or curl when the temperature changes. That is, when the engine is not started so that the temperature of the bypass opening area control means is substantially equal to the surrounding temperature, the bimetallic strips contact each other as shown in FIG. 16(a) to define the minimum area of the bypass opening 127, but when the temperature rises, the bimetallic strips 126 are bent or curled outwardly away from each other to increase the area of the bypass opening 127.

Figure 17:
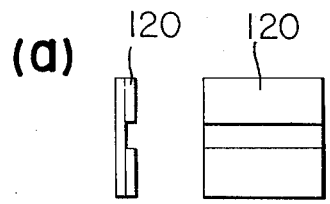
Figure 17:
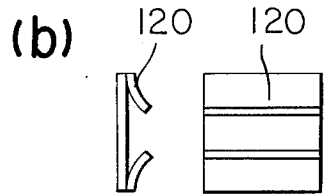

In the bypass opening area control means shown in FIG. 17, two bimetallic strips 120 are vertically or horizontally spaced apart from each other so that when the engine is cold, the bimetallic strips 120 are straight to define the minimum opening area therebetween as shown in FIG. 17. However, when the temperature rises, the bimetallic strips are bent or curled outwardly so that the opening area is increased as shown in FIG. 17(b).

Figure 18:
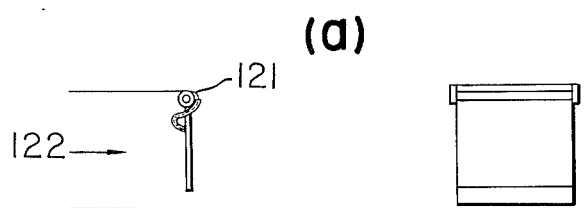
Figure 18:
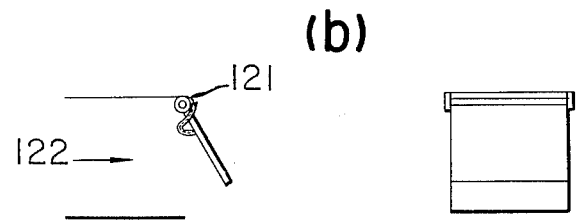

In the bypass opening area control means shown in FIG. 18, both the bending or curling of a bimetallic strip 121 and the flow of exhaust gases 113 are utilized. That is, when the engine is cold or is running at a slow speed, the bimetallic strip 121 is straight as shown in FIG. 18(a) to define the minimum area of the bypass opening. But when the temperature rises and the flow rate of the exhaust gases increases as the engine is running at a faster speed, the exhaust gases push the bimetallic strip 121 while the latter bends or curl outwardly due to the temperature rise so that the area of the bypass opening may be increased. As a variation, instead of the bimetallic strip 121, a flap made of a metal may be used in such a way that it may swing only under the pressure of the exhaust gases.

Figure 19:
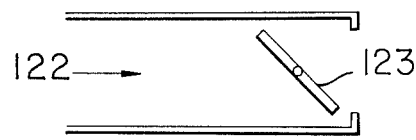

The bypass opening area control means shown in FIG. 19 comprises a throttle valve 123 disposed on the upstream side of the bypass opening. The angular position of the throttle valve 116 may be controlled by any suitable conventional control system in response to the temperature of the first catalytic layer, whereby the opening angle of the throttle valve 123 and hence the area of the bypass opening may be varied.

While the underlying principles of the present invention have been made clear in the above illustrative embodiments, there will be immediately obvious to those skilled in the art that may modifications in structure, arrangement, proportions, the elements, materials and components used in the practice of the invention and otherwise, which are particularly adapted for specific environment and operating requirements, without departing from those principles. The appended claims are therefore intended to cover and embrace any such modification within the limits only of the true spirit and scope of the present invention.

What is claimed is:

1. A catalytic converter for purifying the exhaust gases from an internal combustion engine, comprising:
   a tubular metallic casing having an exhaust gas inlet port at one end and an exhaust gas outlet port at the other end;
   a first catalyst stage disposed within said casing, said stage comprising:
   a perforated metallic inner tube generally coaxial with said casing and forming an interior conduit communicating with said inlet and outlet ports;
   a ring shaped metallic end disk adjacent said inlet port and extending between and connected to a front end of said tube and the interior wall of said casing for supporting said tube in said generally coaxial relationship to said casing, so that said inlet port may communicate exhaust gases through the opening in the disk to the inlet end of the perforated tube;
   a metallic shielding disk adjacent said outlet port and connected between a rear end of said tube and said casing for supporting said tube in said generally coaxial relationship to said casing, said shielding disk partially extending radially into said interior conduit to restrict the passage of exhaust gas through said conduit and having an opening communicating with said conduit through which one portion of said exhaust gas may flow;
   at least one layer comprising catalytic material supported by said inner tube between said disks and disposed between said tube and said casing;
   said shielding disk having an apertured part adjacent said casing for permitting another portion of said exhaust gas to flow therethrough, said one portion of said exhaust gas bypassing said catalyst layer and at least a part of said other exhaust gas portion passing through said layer;
   at least one intermediate catalyst stage disposed within said casing downstream of said first stage, said intermediate stage comprising:
   a perforated metallic inner tube generally coaxial with said casing and forming an interior conduit communicating with said inlet and outlet ports;
   a ring shaped metallic end disk adjacent said inlet port and extending between and connected to a front end of said tube of said intermediate stage and the interior wall of said casing for supporting said tube of said intermediate stage in said generally coaxial relationship to said casing, so that said inlet port may communicate exhaust gases through the opening in the disk of said intermediate stage to the inlet end of the perforated tube of said intermediate stage;
   a metallic shielding disk adjacent said outlet port and connected between a rear end of said tube of said intermediate stage and said casing for supporting said tube of said intermediate stage in said generally coaxial relationship to said casing, said shielding disk of said intermediate stage extending radially into said interior conduit of said intermediate stage to restrict the passage of exhaust gas through said conduit of said intermediate stage and having an opening communicating with said conduit of said intermediate stage through which one portion of said exhaust gas may flow;
   at least one layer comprising catalytic material supported by said inner tube of said intermediate stage between said disks of said intermediate stage and disposed between said tube of said intermediate stage and said casing of said intermediate stage;
   said shielding disk of said intermediate stage having an apertured part adjacent said casing for permitting another portion of said exhaust gas to flow therethrough, said one portion of said exhaust gas bypassing said catalyst layer of said intermediate stage and at least a part of said other exhaust gas portion passing through said layer of said intermediate stage;
   a final catalyst stage disposed within said casing and downstream of said at least one intermediate catalyst stage, said final stage comprising:
   a final perforated metallic inner tube generally coaxial with said casing and having a final interior conduit communicating with said inlet and outlet ports;
   a final ring shaped metallic end disk adjacent said inlet port of said final tube and extending between a front end of said final tube and said casing for supporting said final tube in said generally coaxial relationship to said casing;
   a final metallic shielding disk adjacent said outlet port of said final tube and extending between a rear end of said final tube and said casing for supporting said final tube in said generally coaxial relationship to said casing,
   said final tube cooperating with said casing to form a first interior cylindrical gas flow path and a second exterior annular exhaust gas flow path,
   said shielding disk of said final stage having a substantially imperforate part covering said interior gas flow path for blocking only one of said exhaust gas flow paths;
   at least one second layer comprising catalytic material supported by said final inner tube between said disks of said final stage and disposed between said final tube and said casing;

said end disk of said final stage being spaced apart from said shielding disk of said intermediate stage adjacent thereto to define a combining region for said exhaust gas portions, said end disk of said final stage having a substantially imperforate part for blocking one end of said second exterior annular exhaust gas flow path, so that substantially all of said exhaust gas is caused to flow through said final catalytic layer.

2. The converter according to claim 1, further comprising a surging tank adjacent the shielding plate of said final stage and having a chamber communicating with said blocked one of said exhaust gas flow paths.

3. A catalytic converter for purifying the exhaust gases from an internal combustion engine, comprising:
   a tubular metallic casing having an exhaust gas inlet port at one end and an exhaust gas outlet port at the other end;
   at least one intermediate catalyst stage disposed within said casing, said stage comprising:
      a perforated metallic inner tube generally coaxial with said casing and forming an interior conduit communicating with said inlet and outlet ports;
      a ring shaped metallic end disk adjacent said inlet port and extending between and connected to a front end of said tube and the interior wall of said casing for supporting said tube in said generally coaxial relationship to said casing, so that said inlet port may communicate exhaust gases through the opening in the disk to the inlet end of the perforated tube;
      a metallic shielding disk adjacent said outlet port and connected between a rear end of said tube and said casing for supporting said tube in said generally coaxial relationship to said casing, said shielding disk partially extending radially into said interior conduit to restrict the passage of exhaust gas through said conduit and having an opening communicating with said conduit through which one portion of said exhaust gas may flow;
   at least one layer comprising catalytic material supported by said inner tube between said disks and disposed between said tube and said casing;
   said shielding disk having an apertured part adjacent said casing for permitting another portion of said exhaust gas to flow therethrough, said one portion of said exhaust gas bypassing said catalyst layer and at least a part of said other exhaust gas portion passing through said layer;
   a final catalyst stage disposed within said casing and downstream of said at least one intermediate catalyst stage, comprising:
      a final perforated metallic inner tube generally coaxial with said casing and having a final interior conduit communicating with said inlet and outlet ports;
      a final ring shaped metallic end disk adjacent said inlet port of said final tube and extending between a front end of said final tube and said casing for supporting said final tube in said generally coaxial relationship to said casing;
      a final metallic shielding disk adjacent said outlet port of said final tube and extending between a rear end of said final tube and said casing for supporting said final tube in said generally coaxial relationship to said casing, said final perforated inner tube cooperating with the interior wall of said casing to form a first interior cylindrical gas flow path and a second exterior annular exhaust gas flow path,
   said shielding disk of said final stage having a substantially imperforate part covering said interior gas flow path for blocking only one of said exhaust gas flow paths;
   at least one final layer comprising catalytic material supported by said final inner tube between said disks of said final stage and disposed between said final tube and said casing;
   said end disk of said final stage being spaced apart from said shielding disk of said intermediate stage adjacent thereto to define a combining region for said exhaust gas portions, said end disk of said final stage having a substantially imperforate part for blocking one end of said second exterior annular exhaust gas flow path, so that substantially all of said exhaust gas is caused to flow through said final catalytic layer; and
   temperature sensitive means comprising two bimetallic strips spaced apart from each other and movable away from each other in response to increase in the temperature thereof, said temperature sensitive means being connected to said shielding disk of said intermediate catalyst stage for varying the area of said opening in said shielding disk of said intermediate stage in accordance with the temperature of said first mentioned catalytic layer.

4. A catalytic converter for purifying the exhaust gases from an internal combustion engine, comprising:
   a tubular metallic casing having an exhaust gas inlet port at one end and an exhaust gas outlet port at the other end;
   at least one intermediate catalyst stage disposed within said casing, said stage comprising:
      a perforated metallic inner tube generally coaxial with said casing and forming an interior conduit communicating with said inlet and outlet ports;
      a ring shaped metallic end disk adjacent said inlet port and extending between and connected to a front end of said tube and the interior wall of said casing for supporting said tube in generally coaxial relationship to said casing, so that said inlet port may communicate exhaust gases through the opening in the disk to the inlet end of the perforated tube disk;
      a metallic shielding disk adjacent said outlet port and connected between a rear end of said tube and said casing for supporting said tube in said generally coaxial relationship to said casing, said shielding disk partially extending radially into said interior conduit to restrict the passage of exhaust gas through said conduit and having an opening communicating with said conduit through which one portion of said exhaust gas may flow;
   at least one layer comprising catalytic material supported by said inner tube between said disks and disposed between said tube and said casing;
   said shielding disk having an apertured part adjacent said casing for permitting another portion of said exhaust gas to flow therethrough, said one portion of said exhaust gas bypassing said catalyst layer and at least a part of said other exhaust gas portion passing through said layer;

a final catalyst stage disposed within said casing and downstream of said at least one intermediate catalyst stage, comprising:
a final perforated metallic inner tube generally coaxial with said casing and having a final interior conduit communicating with said inlet and outlet ports;
a final ring shaped metallic end disk adjacent inlet port of said final tube and extending between a front end of said final tube and said casing for supporting said final tube in said generally coaxial relationship to said casing;
a final metallic shielding disk adjacent said outlet port of said final tube and extending between a rear end of said final tube and said casing for supporting said final tube in said generally coaxial relationship to said casing,
said final perforated inner tube cooperating with the interior wall of said casing to form a first interior cylindrical gas flow path and a second exterior annular exhaust gas flow path,
said final shielding disk having a substantially imperforate part covering said interior gas flow path for blocking only one of said exhaust gas flow paths;
at least one final layer comprising catalytic material supported by said final inner tube between said disks of said final stage and disposed between said final tube and said casing;
said end disk of said final stage being spaced apart from said shielding disk of said intermediate stage adjacent thereto to define a combining region for said exhaust gas portions, said end disk of said final stage having a substantially imperforate part for blocking one end of said second exterior annumar exchaust gas flow path, so that substantially all of the said exhaust gas is caused to flow through said final catalytic layer; and
temperature sensitive means comprising a bimetallic element in the form of a hollow truncated cone, an annular surface of said element adjacent the truncated end of the cone having a plurality of slits therein to form a corresponding plurality of bimetallic strips thereat, said temperature sensitive means being connected to said shielding disk of said intermediate catalyst stage for varying the area of said opening in said shielding disk of said intermediate stage in accordance with the temperature on said first-mentioned catalytic layer.

5. The converter according to claim 4, wherein each said catalytic layer comprises a silica cloth having a precious metal disposed on a surface thereof.

6. A device for purifying the exhaust gases from an internal combustion engine having a catalytic device comprising two or more series connected catalytic stages disposed within a metallic casing, each stage comprising:
a perforated inner tube coaxial with said casing and having front and rear ends;
a metallic plate attached to the front end of said inner tube and to the inner wall of said metallic casing;
a second metallic plate supporting said tube and shielding the rear end thereof, an annular passage being formed between said second plate and the inner wall of said metallic casing; and
a catalytic layer wrapped around the outer side wall of said perforated inner tube between said first metallic and second metallic plates, at least one centrally located bypass opening in the second metallic plate of each stage except the last stage, all of the exhaust gases passing through the catalytic layer in the last catalytic stage, while in all of the remaining catalytic stages a part of the exhaust gases may bypass the catalytic layer thereof without making contact therewith,
one of said catalytic layers being mounted around a perforated side wall of an inner tube held position within said metallic casing by supporting members attached to the front and rear ends of said inner tube, an exhaust gas bypass opening formed through one of said front and rear supporting members, and temperature sensitive bypass opening area control means attached to said exhaust gas bypass opening for varying the area of said bypass opening in response to the temperature of said one catalytic layer.

7. A catalytic converter for purifying the exhaust gases from an internal combustion engine, comprising:
a tubular metallic casing having an exhaust gas inlet port at one end and an exhaust gas outlet port at the other end;
at least one intermediate catalyst stage disposed within said casing, said stage comprising:
a perforated metallic inner tube generally coaxial with said casing and forming an interior conduit communicating with said inlet and outlet ports;
a ring shaped metallic end disk adjacent said inlet port and extending between and connected to a front end of said tube and the interior wall of said casing for supporting said tube in said generally coaxial relationship to said casing, so that said inlet port may communicate gases through the opening in the disk to the inlet end of the perforated tube;
a metallic shielding disk adjacent said outlet port and connected between a rear end of said tube and said casing for supporting said tube in said generally coaxial relationship to said casing, said shielding disk partially extending radially into said interior conduit to restrict the passage of exhaust gas through said conduit and having an opening communicating with said conduit through which one portion of said exhaust gas may flow;
at least one layer comprising catalytic material supported by said inner tube between said disks and disposed between said tube and said casing;
said shielding disk having an apertured part adjacent said casing for permitting another portion of said exhaust gas to flow therethrough, said one portion of said exhaust gas bypassing said catalyst layer and at least a part of said other exhaust gas portion passing through said layer;
a final catalyst stage disposed within said casing and downstream of said at least one intermediate catalyst stage, comprising:
a final perforated metallic inner tube generally coaxial with said casing and having a final interior conduit communicating with said inlet and outlet ports;
a final ring shaped metallic end disk adjacent inlet port of said final tube and extending between a front end of said final tube and said casing for supporting said final tube in said generally coaxial relationship to said casing;
a final metallic shielding disk adjacent said outlet port of said final tube and extending between a rear end of said final tube and said casing for supporting said second tube in said generally coaxial relationship to said casing, said final perforated inner tube cooperating with the interior wall of said casing to form a first interior cylindrical gas flow path and a second exterior annular exhaust gas flow path, said shielding disk of said final stage having a substantially imperforate part covering said interior gas flow path for blocking only one of said exhaust gas flow paths;

at least one final layer comprising catalytic material supported by said final inner tube between said disks of said final stage and disposed between said final tube and said casing;

said end disk of said final stage being spaced apart from said shielding disk of said intermediate stage adjacent thereto to define a combining region for said exhaust gas portions, said end disk of said final stage having a substantially imperforate part for blocking one end of said second exterior annular exhaust gas flow path, so that substantially all of said exhaust gas is caused to flow through said final catalytic layer; and temperature sensitive means connected to said shielding disk of said intermediate catalyst stage for varying the area of said shielding disk of said intermediate stage in accordance with the temperature of said first-mentioned catalytic layer.

* * * * *

UNITED STATES PATENT AND TRADEMARK OFFICE
CERTIFICATE OF CORRECTION

PATENT NO. : 4,175,107

DATED : November 20, 1979

INVENTOR(S) : Kazuo Iwaoka, et al

It is certified that error appears in the above—identified patent and that said Letters Patent is hereby corrected as shown below:

Column 1, line 15: "an" should be --and--.

line 67: "on" should be --or--.

Column 5, line 40: "46" should be --45--.

Column 6, line 39: "800" should be --300--.

line 65: "56" should be --55--.

Column 8, line 8: "he" should be --the--.

line 44: "to" (1st occurrence) should be --in--.

Column 15, line 34: "annumar" should be --annular--.

line 35: "exchaust" should be --exhaust--.

Signed and Sealed this

Tenth Day of June 1980

[SEAL]

Attest:

SIDNEY A. DIAMOND

Attesting Officer     Commissioner of Patents and Trademarks